US 12,077,479 B2

United States Patent
Thomas et al.

(10) Patent No.: US 12,077,479 B2
(45) Date of Patent: Sep. 3, 2024

(54) RECESSION RESISTANT INTERMEDIATE LAYER FOR CMC VANE

(71) Applicants: Rolls-Royce Corporation, Indianapolis, IN (US); Rolls-Royce plc, London (GB)

(72) Inventors: David J. Thomas, Brownsburg, IN (US); Thomas Nixon, Brownsburg, IN (US); Michael Whittle, Derby (GB); Jeffrey Crutchfield, Long Beach, CA (US)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 1241 days.

(21) Appl. No.: 16/788,917

(22) Filed: Feb. 12, 2020

(65) Prior Publication Data

US 2021/0246081 A1   Aug. 12, 2021

(51) Int. Cl.
*C04B 41/45* (2006.01)
*C04B 41/50* (2006.01)
(Continued)

(52) U.S. Cl.
CPC ...... *C04B 41/4584* (2013.01); *C04B 41/4505* (2013.01); *C04B 41/5024* (2013.01); *C04B 41/5059* (2013.01); *C04B 41/5066* (2013.01); *C04B 41/52* (2013.01); *C04B 41/87* (2013.01); *B32B 3/08* (2013.01); *B32B 5/06* (2013.01); *B32B 18/00* (2013.01); *B32B 2260/021* (2013.01); *B32B 2262/105* (2013.01); *B32B 2305/026* (2013.01); *B32B 2305/80* (2013.01); *B32B 2603/00* (2013.01);
(Continued)

(58) Field of Classification Search
CPC ............ C04B 41/4584; C04B 41/4505; C04B 41/5001; C04B 41/52; C04B 41/87; C04B 2235/5252; C04B 2235/6025; C04B 2235/614; C04B 2235/616
See application file for complete search history.

(56) References Cited

U.S. PATENT DOCUMENTS 5,494,867 A * 2/1996 Schwab ................. C08G 77/62
  427/226
6,607,852 B2 8/2003 Spitsberg et al.
(Continued)

FOREIGN PATENT DOCUMENTS

EP     3 345 886 A1    1/2018
WO    WO 2014/150380 A1    9/2014

OTHER PUBLICATIONS

Kopeliovich, "Fabrication of Ceramic Matrix Composites by Polymer Infiltration and Pyrolysis (PIP)," SubsTech, dated Jun. 2, 2012, pp. 1-3, published online by SubsTech at URL https://www.substech.com/dokuwiki/doku/php?id=fabrication_of_ceramic_matrix_composites_by_polymer_infiltration_and_pyrolysis_pip.

*Primary Examiner* — Nathan H Empie
(74) *Attorney, Agent, or Firm* — Shumaker & Sieffert, P.A.

(57) ABSTRACT

A ceramic matrix composite (CMC) component is provided that includes: a CMC body in which an environmental protection layer is completely embedded within a CMC material of the CMC body, the environmental protection layer comprising a ceramic that has a higher impact and/or environmental resistance than the CMC material. Methods for manufacturing the CMC component are also provided.

12 Claims, 7 Drawing Sheets

(51) Int. Cl.
  *C04B 41/52*   (2006.01)
  *C04B 41/87*   (2006.01)
  *B32B 3/08*    (2006.01)
  *B32B 5/06*    (2006.01)
  *B32B 18/00*   (2006.01)

(52) U.S. Cl.
  CPC ........... *C04B 2235/5252* (2013.01); *C04B 2235/6025* (2013.01); *C04B 2235/6027* (2013.01); *C04B 2235/614* (2013.01); *C04B 2235/616* (2013.01); *C04B 2235/96* (2013.01)

(56) References Cited

U.S. PATENT DOCUMENTS

| | | | |
|---|---|---|---|
| 10,240,460 B2 | 3/2019 | Thomas et al. | |
| 2008/0124512 A1* | 5/2008 | Steibel | F01D 5/284 428/105 |
| 2013/0136915 A1* | 5/2013 | Naik | C04B 41/009 427/419.7 |
| 2015/0322795 A1* | 11/2015 | Thomas | F01D 5/08 415/177 |
| 2017/0350268 A1* | 12/2017 | McCaffrey | F01D 25/28 |
| 2018/0002238 A1* | 1/2018 | Hockemeyer | C04B 35/571 |
| 2019/0040760 A1 | 2/2019 | Clegg | |

* cited by examiner

RECESSION RESISTANT INTERMEDIATE LAYER FOR CMC VANE

TECHNICAL FIELD

This disclosure relates to ceramic matrix composites and, in particular, to increasing impact and/or environmental resistance of ceramic matrix composites.

BACKGROUND

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components. Present CMCs suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A ceramic matrix composite (CMC) component is provided that includes: a CMC body in which an environmental protection layer is completely embedded within a CMC material of the CMC body, the environmental protection layer comprising a ceramic that has a higher impact and/or environmental resistance than the CMC material.

A method of manufacturing a ceramic matrix composite (CMC) component is provided that includes: providing at least a portion of a ceramic fiber preform comprising a lay-up of ceramic fiber plies; embedding an environmental protection layer precursor in at least the portion of the ceramic fiber preform; completing the ceramic fiber preform if only the portion of the ceramic fiber preform is provided when the environmental protection layer precursor is embedded; and forming, from the ceramic fiber preform in which the environmental protection layer precursor was embedded, a CMC body of the CMC component, wherein the CMC body comprises a CMC material completely surrounding an environmental protection layer formed from the environmental protection layer precursor.

One interesting feature of the CMC components described below may be that the CMC component may have a higher impact resistance than if the CMC component were constructed only from the CMC material. Alternatively or in addition, an interesting feature of the systems and methods described below may be that the CMC component may have a higher environmental resistance than if the CMC component were constructed only from the CMC material.

Figure 1:
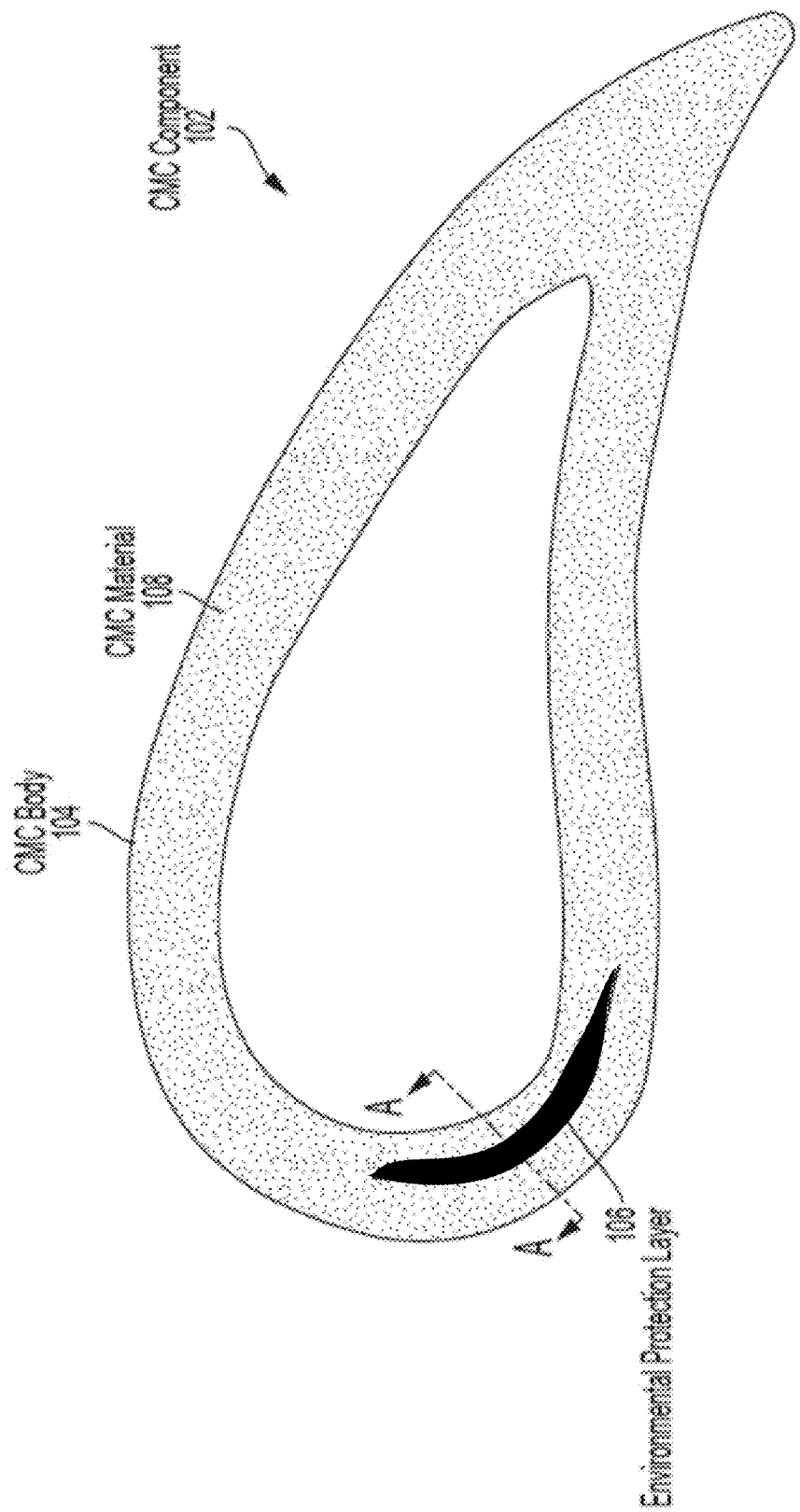
FIG. 1 is a cross-section view of an example a ceramic matrix composite (CMC) component comprising a CMC body in which an environmental protection layer is completely embedded within a CMC material of the CMC body.

FIG. 1 is a cross-section view of an example a ceramic matrix composite (CMC) component 102 comprising a CMC body 104 in which an environmental protection layer 106 is completely embedded within a CMC material 108 of the CMC body 104. The environmental protection layer 106 comprises a ceramic that has a higher impact and/or environmental resistance than the CMC material. Impact resistance is a material's ability to withstand intense force or shock applied to the material over a relatively short period of time. The impact resistance of the materials may be determined using any impact test method known in the art, such as the Izod impact test or the Charpy impact test. The environmental resistance is an ability of the material to resist chemical degradation of the caused by action of air or other gaseous mediums to which the material is subjected during use.

The environmental protection layer 106 may include any ceramic such as silicon carbide, a silicate, and/or a rare earth silicate. Examples of the silicate include a ytterbium silicate, a yttrium silicate, a barium strontium aluminosilicate, and/or mullite. Alternatively or in addition, environmental protection layer 106 may include a rare earth element comprising ytterbium and/or yttrium. In some examples, the rare earth silicate may be selected from the group consisting of: ytterbium monosilicate (YbSiO5), ytterbium disilicate (YbSi2O7), yttrium monosilicate (Y2SiO5) and yttrium disilicate (Y2Si2O7). The material(s) of the environmental protection layer 106 may be selected to have the same or substantially similar (within about 10%) thermal expansion as the CMC material 108. Having the same or substantially similar thermal expansion coefficients helps prevent thermally-induced cracking of the CMC component 102 during use in a relatively hot environment, such as within a gas turbine engine. In some examples, the environmental protection layer 106 does not include any ceramic fibers. In other examples, the environmental protection layer 106 includes ceramic fibers.

The CMC material 108 may comprise any ceramic matrix composite. The CMC material 108 includes ceramic fibers embedded in a ceramic matrix. The matrix and fibers may comprise any ceramic material.

In the example shown in FIG. 1, the CMC component 102 is an airfoil included in a gas turbine engine, such as a turbine blade or a stator. Alternatively, the CMC component 102 may be any other component of a gas turbine engine. In still other examples, the CMC component 102 may be a component of a device other than a gas turbine engine. As shown in FIG. 1, an outward facing surface of the environmental protection layer 106 may follow the contour of an outer surface of the CMC body 104.

Figure 2:
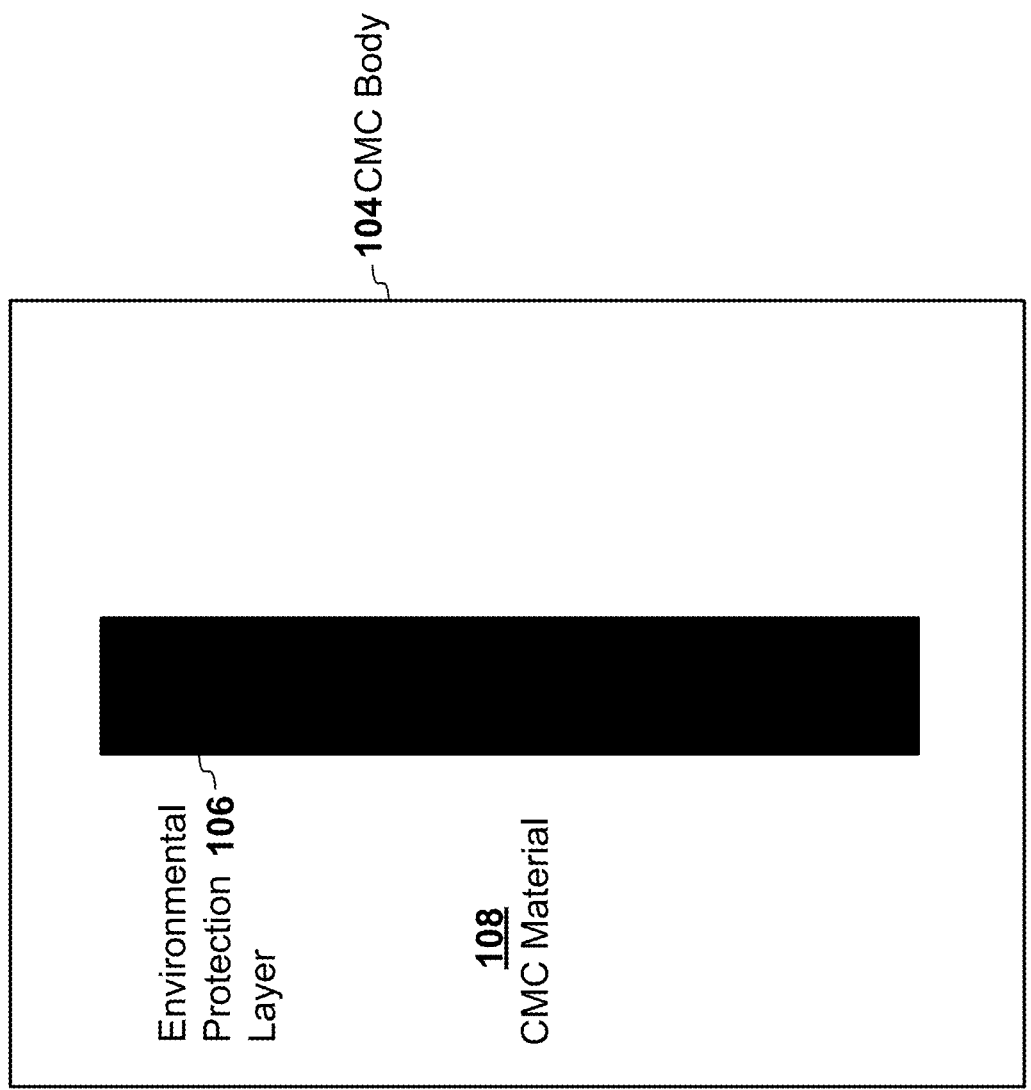
FIG. 2 shows a cross-section of the CMC component 102 taken in a plane indicated by the arrows A-A in FIG. 1.

The cross-section of the airfoil shown in FIG. 1 (the CMC component 10) is taken in a plane that is perpendicular to a radial direction of the airfoil. In other words, the plane runs in a chord-wise direction of the airfoil. In contrast, FIG. 2 shows a cross-section of the CMC component 102 taken in a plane indicated by the arrows A-A in FIG. 1. The plane that is indicated by the arrows A-A extends in a radial direction of the airfoil: in other words, in a span-wise direction of the airfoil. Both FIGS. 1 and 2 show the environmental protection layer 106 completely surrounded by the CMC material 108. In the example shown, all sides of the environmental protection layer 106 are in contact with the CMC material 108 of the CMC body 104.

Figure 3:
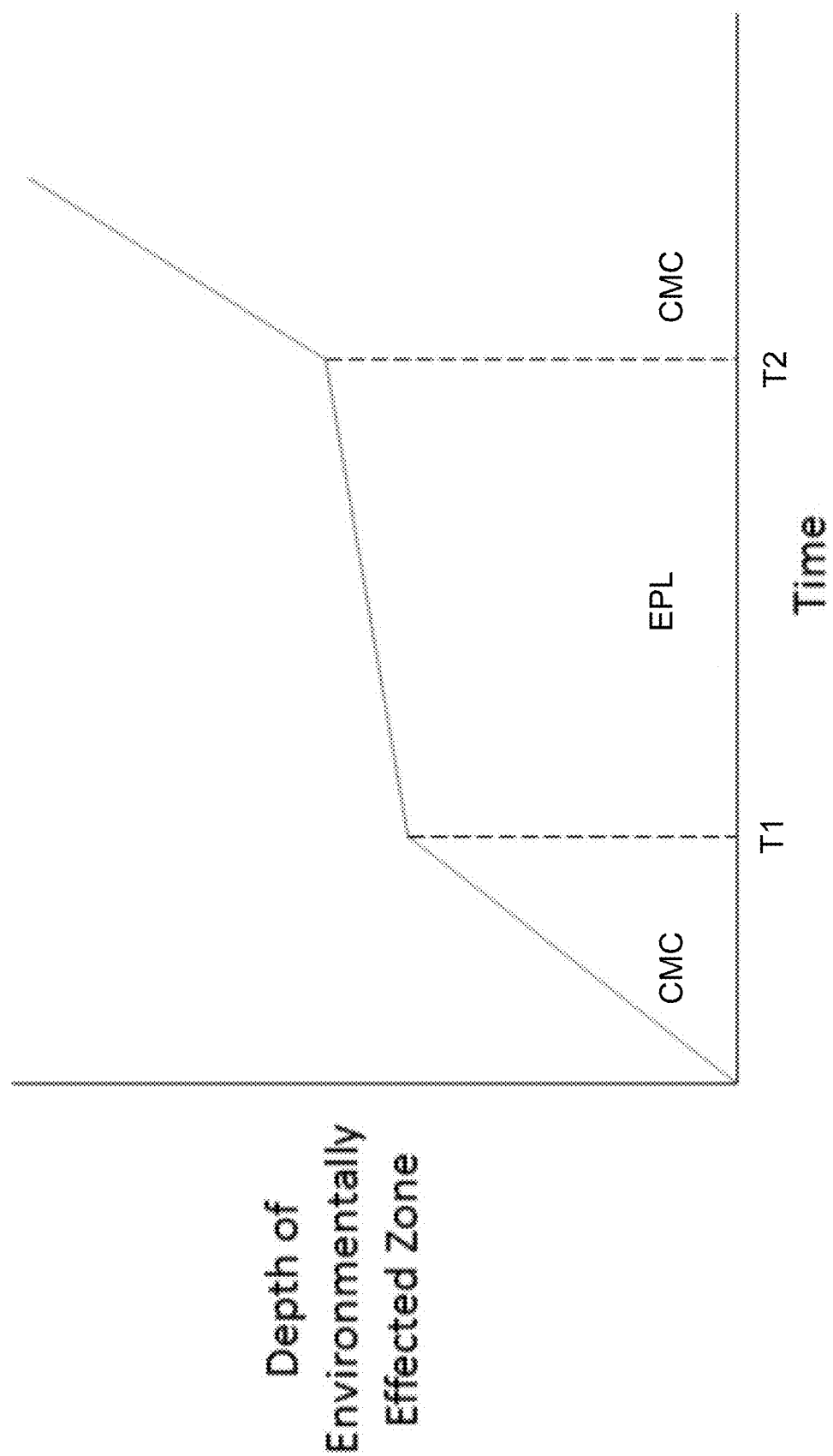
FIG. 3 illustrates an example graph of a depth of damage to the CMC body 104 over time.

FIG. 3 illustrates an example graph of a depth of damage to the CMC body 104 over time. The damage may be caused by environmental attack or degradation, such as water or other chemicals reacting with the CMC body 104. Alternatively or in addition, the damage may include impact damage caused by particles or other objects striking the CMC body 104.

Up to time T1, the CMC body 104 is damaged by impacts and/or the environment. The time T1 is the time at which the damage to the CMC body 104 reaches the environmental protection layer 106. At time T1, a portion of the CMC material 108 may be worn off exposing the environmental protection layer 106. Alternatively or in addition, the CMC material 108 may include voids or other damage extending from an outer surface of the CMC body 104 to the environmental protection layer 106. Between time T1 and T2, the environmental protection layer 106 is damaged. The rate at which the damage depth increases slows during this time because the impact resistance of the environmental protection layer 106 is higher than the impact resistance of the CMC material 108. After the depth of the damage reaches through the environmental protection layer 106, the rate at which the damage depth increases, picks back up again. In other examples, the CMC component 102 may be replaced before the damage completely penetrates the environmental protection layer 106.

Figure 4:
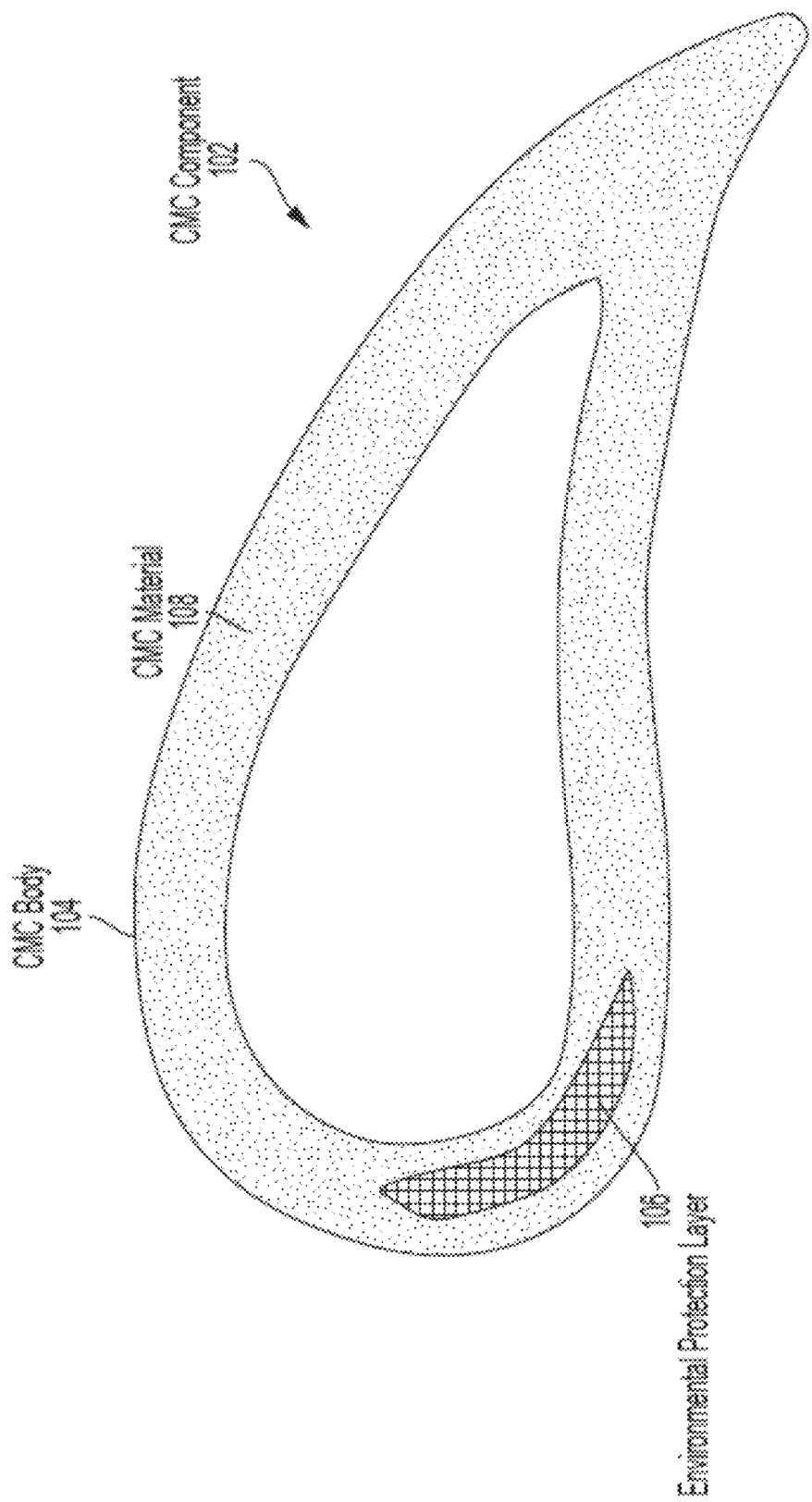
FIG. 4 is a cross-sectional view of an example of the CMC component 102 in which the environmental protection layer 106 is a diffuse layer.

FIG. 4 is a cross-sectional view of an example of the CMC component 102 in which the environmental protection layer 106 is a diffuse layer. For example, the environmental protection layer 106 may include portions comprising a matrix material that is also included in the CMC material 108.

Figure 5:
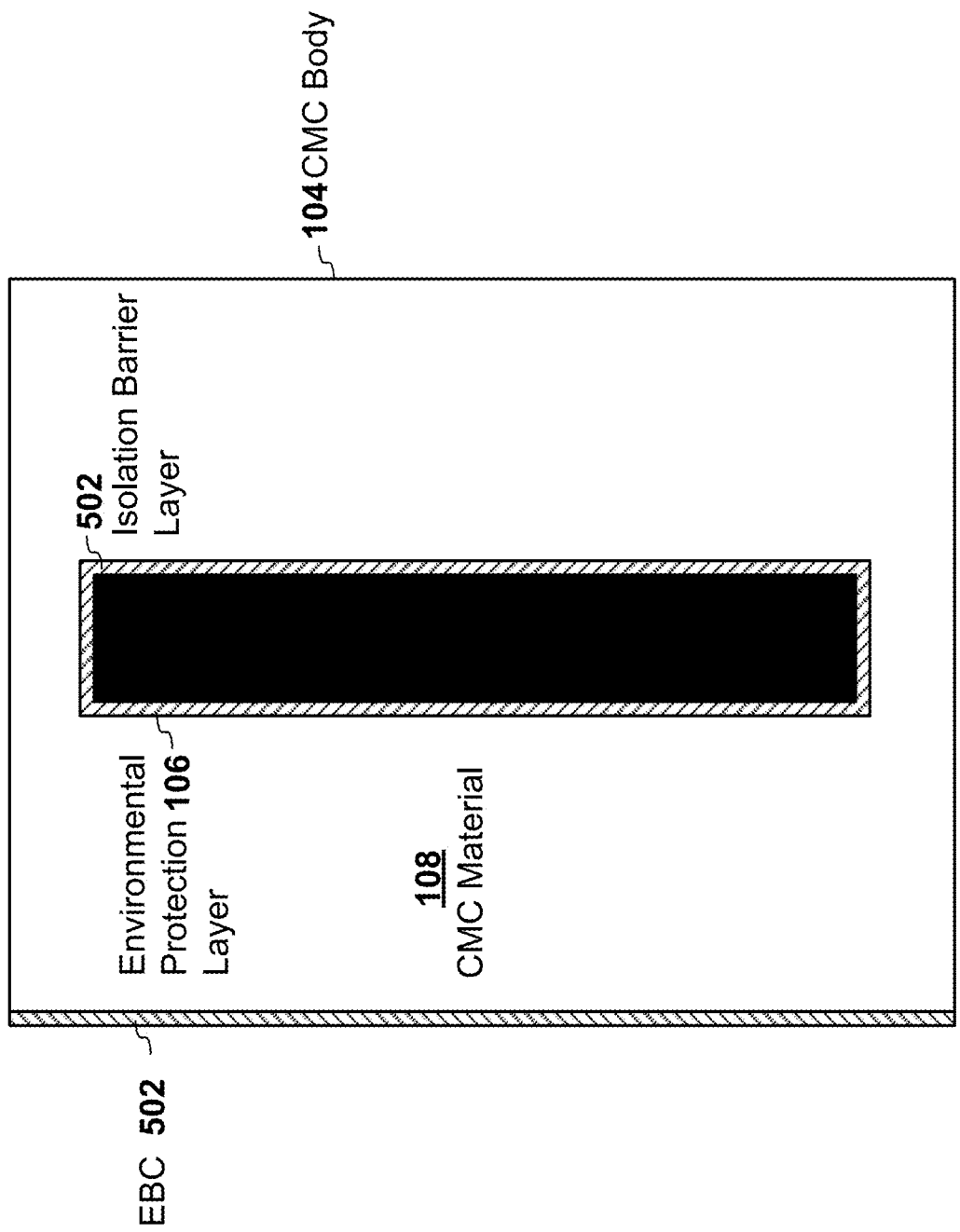
FIG. 5 is a cross-sectional view of an example of the component in which the environmental protection layer includes an isolation barrier layer.

FIG. 5 is a cross-sectional view of an example of the CMC component 102 in which the environmental protection layer 106 includes an isolation barrier layer 502. In the illustrated example, the isolation barrier layer 502 forms a shell around the environmental protection layer 106. In some examples, the shell completely surrounds the environmental protection layer 106. Alternatively, only a portion of the environmental protection layer 106 may have the isolation barrier layer 502 thereon. For example, the isolation barrier layer 502 may be on only the portion of the environmental protection layer 106 that faces an external surface of the CMC body 104. The isolation barrier layer 502 may comprise, for example, silicon carbide (SiC) or silicon nitride ($Si_3N_4$).

The CMC body 104 may additionally include an environmental barrier coating 502 on an outer surface of the CMC body 104. The environmental barrier coating 502 may be applied to the CMC body 104 as is known in the art.

Figure 6:
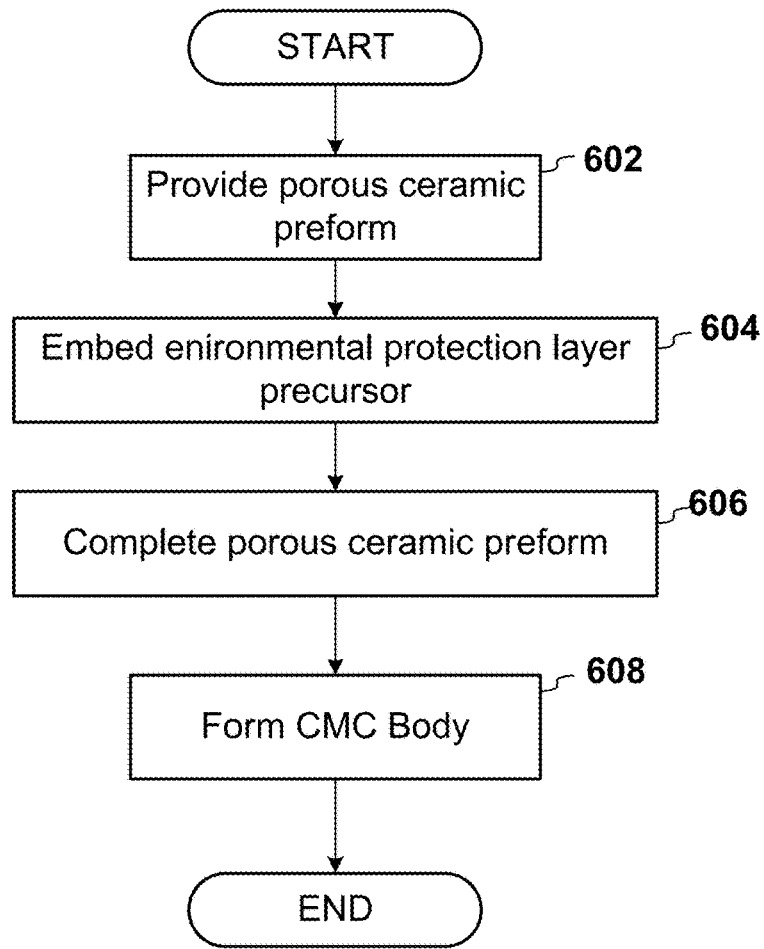
FIG. 6 illustrates a flow diagram of an example of steps to manufacture the CMC component.

FIG. 6 illustrates a flow diagram of an example of steps to manufacture the CMC component 102 comprising the CMC body 104 in which the environmental protection layer 106 is completely embedded within the CMC material 108 of the CMC body 104. The steps are described below referring both to FIG. 6 and FIG. 7, the latter of which illustrates an example of a ceramic fiber preform 702 in the shape of an airfoil. In the illustrated example, details of the trailing edge of the airfoil are not relevant to the following explanation, and are therefore omitted from FIG. 7 for clarity.

Operations may begin by providing (602) at least a portion 706 of the ceramic fiber preform 702. The ceramic fiber preform 702 comprises a lay-up of ceramic fiber plies 704. The ceramic fiber preform 702 may or may not have been rigidized when the ceramic fiber preform 702 or the portion 706 is provided. The lay-up may have been created by layering the ceramic fiber plies 704, a first layer of the ceramic fiber plies 704 on a tool/mandrel 708, and subsequently on each successive one of the layers.

The ceramic fiber preform 702 may be porous because of spaces between the ceramic fiber plies 704 and/or between fibers of the ceramic fiber plies 704. Each of the ceramic fiber plies 704 may comprise a 2D woven or nonwoven layer of ceramic fibers. Alternatively or in addition, the ceramic fiber preform 702 and/or one or more of the ceramic fiber plies 704 may include a 3D weave. The terms "2D woven" and "2D weave" may be used in reference to a conventional weave of (typically) orthogonally-oriented fibers that forms a single layer of interlocking fibers (a "fabric" or "ply"). Although the 2D weave is inherently a three-dimensional structure, the interlocking fibers may be considered to be oriented in a single plane (for example, along x- and y-directions, or warp and weft directions). Typically, 2D weaves are fabricated from continuous fibers, where the fiber length is extremely long compared to the fiber thickness or diameter. The term "nonwoven" may be used to describe a typically random 2D arrangement of fibers held together by a chemical or mechanical bonding agent. Nonwoven fabrics or plies may include entangled chopped (short) and/or continuous ceramic fibers. The terms "3D woven" and/or "3D weave" may be used in reference to a multilayer weaver including fibers (for example, continuous fibers) that interlock two or more layers of fabric and thus include a z-direction component to their orientation. In some examples, the ceramic fiber plies 704 may be formed from unidirectional ceramic fiber tape. The ceramic fiber plies 704 may include prepreg sheets in some examples. The ceramic fibers of the ceramic fiber perform 704 or a subset thereof may be arranged in tows in some examples.

The ceramic fibers of the ceramic fiber preform 702 typically comprise silicon carbide, but may also or alternatively comprise another ceramic, such as silicon nitride, alumina, or aluminosilicate, or carbon. Typically, the ceramic matrix (the matrix material) comprises silicon carbide, but may also or alternatively comprise silicon oxycarbide, silicon nitride, alumina, aluminosilicate, and/or boron carbide or another refractory carbide.

Next, an environmental protection layer precursor 710 may be embedded (604) in at least the portion 706 of the ceramic fiber preform 702. The environmental protection layer precursor 710 may subsequently form the environmental protection layer 106. In some examples, the environmental protection layer precursor 710 is changed during processing. In other examples, the environmental protection layer precursor 710 is unchanged during processing and is, or is included in, the environmental protection layer 106. In one such example, embedding (604) the environmental protection layer precursor 710 comprises positioning a ceramic monolithic insert (the environmental protection layer precursor 710 shown in FIG. 7) on the portion 706 of the ceramic fiber preform 702 or inserting the ceramic monolithic insert into the ceramic fiber preform 702 or into the portion 706 of the ceramic fiber preform 702.

In one example, embedding (604) the environmental protection layer precursor 710 comprises pre-treating the ceramic fiber preform 702 in a targeted area where the environmental protection layer 106 is to be located. For example, the ceramic fiber preform 702 may include a woven cloth of ceramic fibers, and pre-treating the ceramic fiber preform 702 in the targeted area includes pre-impregnating the targeted area of the woven cloth with a material, such as silicon, that ultimately creates an environmentally resistant interphase around the fibers. Pre-treating the ceramic fiber preform 702 in the targeted area may result in the environmental protection layer 106 being diffuse as discussed above.

If only the portion 706 of the ceramic fiber preform 702 is provided when the environmental protection layer precursor 710 is embedded, then the ceramic fiber preform 702 is completed (606). For example, if providing (602) the at least the portion 706 of the ceramic fiber preform 702 comprises providing only the portion 706 of the ceramic fiber preform 702 that includes a first set of layers of ceramic fibers, then completing (606) the ceramic fiber preform 702 comprises adding a second set of layers of ceramic fibers over the environmental protection layer precursor 710 in the lay-up.

Operations may end by, for example, forming (608), from the ceramic fiber preform 702 in which the environmental protection layer precursor 710 was embedded, the CMC body 104 of the CMC component 102. As a result, the CMC body 104 may include the CMC material 108 completely surrounding the environmental protection layer 106 formed from the environmental protection layer precursor 710. Forming (608) the CMC body 104 may include, for example, chemical vapor infiltrating the ceramic fiber preform 702 and/or melt infiltrating the ceramic fiber preform 702. Alternatively, forming (608) the CMC body 104 may include a polymer infiltration and pyrolysis (PIP) process. In other words, forming the CMC body 104 may include repeatedly: impregnating the ceramic fiber preform 702 with a polymer and pyrolyzing the impregnated ceramic fiber preform 702.

Figure 7:
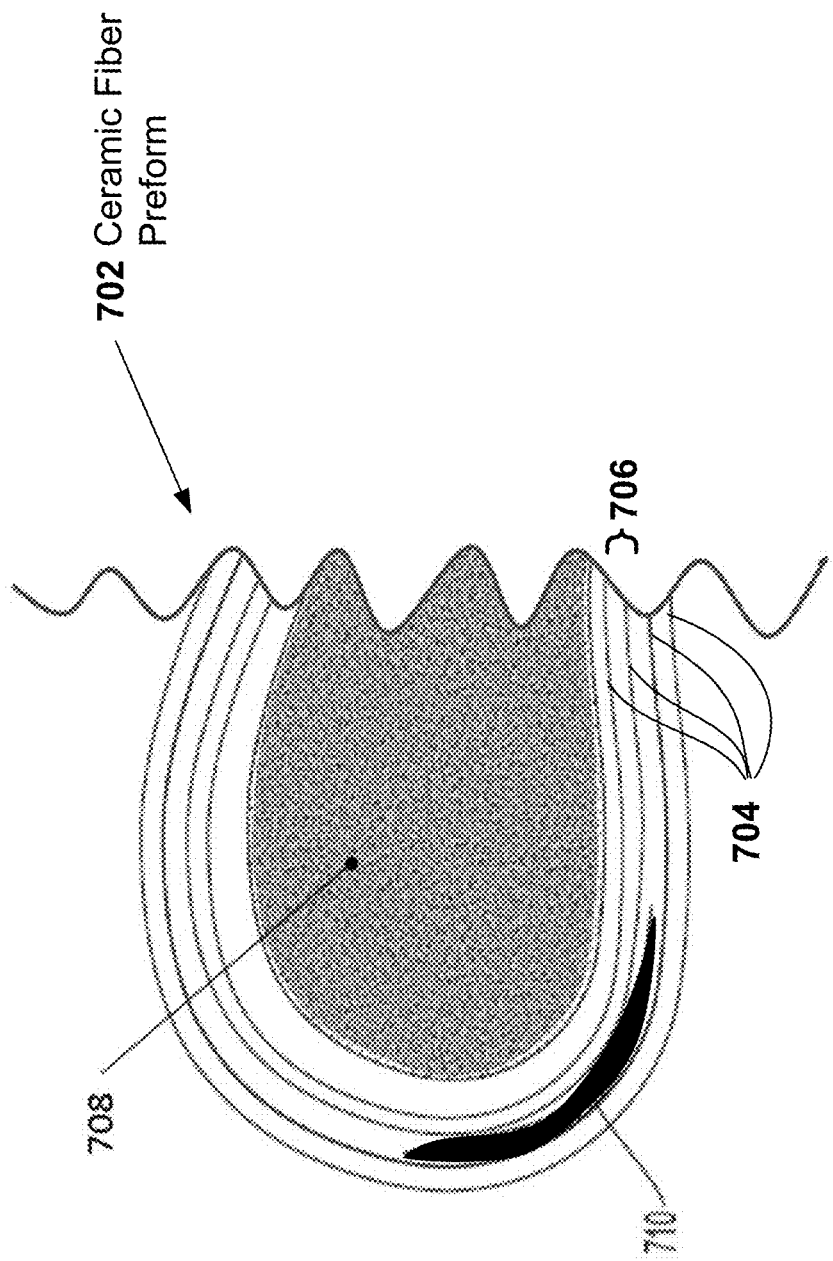
FIG. 7 illustrates an example of a ceramic fiber preform.

In some examples, operations may also include forming the ceramic monolithic insert (the environmental protection layer precursor 710 shown in FIG. 7). The ceramic monolithic insert may be formed before, for example, providing (602) the ceramic fiber preform 702. The ceramic monolithic insert may be formed by: slip casting the ceramic monolithic insert, tape casting the ceramic monolithic insert, machining the ceramic monolithic insert from an initial piece of ceramic material, and/or creating the ceramic monolithic insert using additive manufacturing.

In some examples, the environmental protection layer precursor 710 may change during processing. For example, the environmental protection layer precursor 710 may be formed by a tape-casing process. For example, the environmental protection layer precursor 710 may be or include a sheet comprising ceramic particles in a binder or a preceramic polymer. Embedding (604) the environmental protection layer precursor 710 may include positioning the sheet on a predetermined location of the portion 706 of the ceramic fiber preform 702, where the sheet, when forming (608) the CMC body 104, is dried and/or sintered together with the ceramic fiber preform 702.

In another example, embedding (604) the environmental protection layer precursor 710 comprises spraying the environmental protection layer precursor 710 onto the portion 706 of the ceramic fiber preform 702. The spraying may be performed using plasma spraying. Alternatively or in addition, embedding (604) the environmental protection layer precursor 710 comprises depositing the environmental protection layer precursor 710 using chemical vapor deposition (CVD). Masking may be employed to target the deposition or spray on a predetermined area of the portion 706 of the ceramic fiber preform 702. Alternatively or in addition, embedding (604) the environmental protection layer precursor 710 comprises dip coating the environmental protection layer precursor 710 onto the portion 706 of the ceramic fiber preform 702. Alternatively or in addition, embedding (604) the environmental protection layer precursor 710 comprises brushing the environmental protection layer precursor 710 onto the portion 706 of the ceramic fiber preform 702.

In some examples, the isolation barrier layer 502 may be added to the environmental protection layer precursor 710 before forming (608) the CMC body 104. For example, the isolation barrier layer 502 may be added before completing (606) the ceramic fiber preform 702, before embedding (604) the environmental protection layer precursor 710, and/or before providing (602) the ceramic fiber preform 702. Adding the isolation barrier layer 502 to the environmental protection layer precursor 710 may include, for example, positioning a sheet comprising ceramic particles in a binder or a preceramic polymer onto the environmental protection layer precursor 710; and drying and sintering the sheet together with the ceramic fiber preform 702.

In some examples, the environmental barrier coating 502 may be added to an outer surface of the CMC body 104 after the CMC body 104 is formed (608).

The steps may include additional, different, or fewer operations than illustrated in FIG. 6. The steps may be executed in a different order than illustrated in FIG. 6.

The gas turbine engine may take a variety of forms in various embodiments. For example, the gas turbine engine may be a turboprop, a turbofan, or a turboshaft engine. Furthermore, the gas turbine engine may be an adaptive cycle and/or variable cycle engine. Other variations are also contemplated.

The gas turbine engine may include an intake section, a compressor section, a combustion section, a turbine section, and an exhaust section. During operation of the gas turbine engine. The CMC component 102 may be include in any portion of the gas turbine engine.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a ceramic matrix composite (CMC) component comprising: a CMC body in which an environmental protection layer is completely embedded within a CMC material of the CMC body, the environmental protection layer comprising a ceramic that has a higher impact and/or environmental resistance than the CMC material.

A second aspect relates to the CMC component of aspect 1, wherein the environmental protection layer comprises silicon carbide or silicon nitride.

A third aspect relates to the CMC component of any preceding aspect, wherein the environmental protection layer comprises a silicate including a ytterbium silicate, a yttrium silicate, a barium strontium aluminosilicate, and/or mullite.

A fourth aspect relates to the CMC component of any preceding aspect, wherein the environmental protection layer comprises a rare earth element comprising ytterbium and/or yttrium.

A fifth aspect relates to the CMC component of the fourth aspect, wherein the environmental protection layer comprises a rare earth silicate selected from the group consisting of: ytterbium monosilicate (YbSiO5), ytterbium disilicate (YbSi2O7), yttrium monosilicate (Y2SiO5) and yttrium disilicate (Y2Si2O7).

A sixth aspect relates to the CMC component of any preceding aspect, wherein at least a portion of the environmental protection layer has an isolation barrier layer thereon.

A seventh aspect relates to the CMC component of the sixth aspect, wherein the isolation barrier comprises SiC or Si3N4.

An eighth aspect relates to a method of manufacturing a ceramic matrix composite (CMC) component, the method comprising: providing at least a portion of a porous ceramic fiber preform comprising a lay-up of ceramic fiber plies; embedding an environmental protection layer precursor in at least the portion of the porous ceramic fiber preform; completing the porous ceramic fiber preform if only the portion of the porous ceramic fiber preform is provided when the environmental protection layer precursor is embedded; and forming, from the porous ceramic fiber preform in which the environmental protection layer precursor was embedded, a CMC body of the CMC component, wherein the CMC body comprises a CMC material completely surrounding an environmental protection layer formed from the environmental protection layer precursor.

A ninth aspect relates to the method of the eighth aspect, wherein providing the at least the portion of the porous ceramic fiber preform comprises providing the portion of the porous ceramic fiber preform, which includes a first set of layers of ceramic fibers, and wherein completing the porous ceramic fiber preform comprises adding a second set of layers of ceramic fibers over the environmental protection layer precursor.

A tenth aspect relates to the method of any preceding aspect, wherein embedding the environmental protection layer precursor comprises positioning a ceramic monolithic insert on the portion of the porous ceramic fiber preform or inserting the ceramic monolithic insert into the at least the portion of the porous ceramic fiber preform, wherein the environmental protection layer includes the ceramic monolithic insert.

An eleventh aspect relates to the method of the tenth aspect further comprising forming the ceramic monolithic insert by: slip casting the ceramic monolithic insert, tape casting the ceramic monolithic insert, machining the ceramic monolithic insert from an initial piece of ceramic material, and/or creating the ceramic monolithic insert using additive manufacturing.

A twelfth aspect relates to the method of the eleventh aspect, wherein the environmental protection layer precursor includes a sheet or a tape comprising ceramic particles in a binder or a preceramic polymer, wherein embedding the environmental protection layer precursor comprises positioning the sheet or the tape on the portion of the porous ceramic fiber preform, wherein the sheet or the tape is dried, cured, and/or sintered together with the porous ceramic fiber preform.

A thirteenth aspect relates to the method of any preceding aspect, wherein embedding the environmental protection layer precursor comprises spraying the environmental protection layer precursor onto the portion of the porous ceramic fiber preform.

A fourteenth aspect relates to the method of any preceding aspect, wherein embedding the environmental protection layer precursor comprises dip coating the environmental protection layer precursor onto the portion of the porous ceramic fiber preform.

A fifteenth aspect relates to the method of any preceding aspect, wherein embedding the environmental protection layer precursor comprises brushing the environmental protection layer precursor onto the portion of the porous ceramic fiber preform.

A sixteenth aspect relates to the method of any preceding aspect further comprising adding an isolation barrier to the environmental protection layer precursor before forming the CMC body.

A seventeenth aspect relates to the method of any preceding aspect, wherein adding the isolation barrier to the environmental protection layer comprises: positioning a sheet comprising ceramic particles in a binder or a preceramic polymer onto the environmental protection layer precursor; and drying and sintering the sheet together with the porous ceramic fiber preform precursor.

An eighteenth aspect relates to the method of any preceding aspect further wherein forming the CMC body comprises chemical vapor infiltrating the porous ceramic fiber preform and/or melt infiltrating the porous ceramic fiber preform.

A nineteenth aspect relates to the method of any preceding aspect further comprising forming the CMC body by repeatedly: impregnating the porous ceramic fiber preform with a polymer and pyrolyzing the impregnated porous ceramic fiber preform.

A twentieth aspect relates to the method of any preceding aspect further comprising adding an environmental barrier coating to an outer surface of the CMC body.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of manufacturing a ceramic matrix composite (CMC) component, the method comprising:
   providing at least a portion of a ceramic fiber preform comprising a lay-up of ceramic fiber plies;
   embedding an environmental protection layer precursor in at least the portion of the ceramic fiber preform;
   adding an isolation barrier layer to the environmental protection layer precursor;
   completing the ceramic fiber preform if only the portion of the ceramic fiber preform is provided when the environmental protection layer precursor is embedded; and
   forming, from the ceramic fiber preform in which the environmental protection layer precursor was embedded, a CMC body of the CMC component, wherein the CMC body comprises a CMC material completely surrounding an environmental protection layer formed from the environmental protection layer precursor, wherein the isolation barrier layer is added to the environmental protection layer precursor before forming the CMC body, and wherein adding the isolation barrier layer to the environmental protection layer comprises: positioning a sheet comprising ceramic particles in a binder or a preceramic polymer onto the environmental protection layer precursor; and drying and sintering the sheet together with the ceramic fiber preform.

2. The method of claim 1, wherein providing the at least the portion of the ceramic fiber preform comprises providing the portion of the ceramic fiber preform, which includes a first set of layers of ceramic fibers, and wherein completing the ceramic fiber preform comprises adding a second set of layers of ceramic fibers over the environmental protection layer precursor.

3. The method of claim 1, wherein embedding the environmental protection layer precursor comprises positioning a ceramic monolithic insert on the portion of the ceramic fiber preform or inserting the ceramic monolithic insert into the at least the portion of the ceramic fiber preform, wherein the environmental protection layer includes the ceramic monolithic insert.

4. The method of claim 3, further comprising forming the ceramic monolithic insert by: slip casting the ceramic monolithic insert, tape casting the ceramic monolithic insert, machining the ceramic monolithic insert from an initial piece of ceramic material, and/or creating the ceramic monolithic insert using additive manufacturing.

5. The method of claim 1, wherein the environmental protection layer precursor includes a sheet or a tape comprising ceramic particles in a binder or a preceramic polymer, wherein embedding the environmental protection layer precursor comprises positioning the sheet or the tape on the portion of the ceramic fiber preform, wherein the sheet or the tape is dried, cured, and/or sintered together with the ceramic fiber preform.

6. The method of claim 1, wherein embedding the environmental protection layer precursor comprises spraying the environmental protection layer precursor onto the portion of the ceramic fiber preform.

7. The method of claim 1, wherein embedding the environmental protection layer precursor comprises dip coating the environmental protection layer precursor onto the portion of the ceramic fiber preform.

8. The method of claim 1, wherein embedding the environmental protection layer precursor comprises brushing the environmental protection layer precursor onto the portion of the ceramic fiber preform.

9. The method of claim 1, wherein forming the CMC body comprises chemical vapor infiltrating the ceramic fiber preform and/or melt infiltrating the ceramic fiber preform.

10. The method of claim 1, further comprising forming the CMC body by repeatedly: impregnating the ceramic fiber preform with a polymer and pyrolyzing the impregnated ceramic fiber preform.

11. The method of claim 1, further comprising adding an environmental barrier coating to an outer surface of the CMC body.

12. The method of claim 1, wherein the isolation barrier forms a shell partially or completely surrounding the environmental protection layer precursor.

* * * * *